United States Patent [19]

Frame

[11] 4,343,021
[45] Aug. 3, 1982

[54] IMAGE SENSOR SENSITIVITY VARIATION COMPENSATOR

[75] Inventor: Wayne W. Frame, Longmont, Colo.
[73] Assignee: Ball Corporation, Muncie, Ind.
[21] Appl. No.: 273,102
[22] Filed: Jun. 11, 1981

Related U.S. Application Data

[63] Continuation of Ser. No. 68,468, Aug. 21, 1979, abandoned.

[51] Int. Cl.$^3$ .......................... H04N 5/30; H04N 5/21
[52] U.S. Cl. ...................................... 358/213; 358/163
[58] Field of Search .............................. 358/213, 163; 324/20 CR

[56] References Cited

U.S. PATENT DOCUMENTS

| | | | |
|---|---|---|---|
| 3,743,772 | 7/1973 | Pieters | 358/213 |
| 3,902,011 | 8/1975 | Pieters | 358/163 |
| 3,919,473 | 11/1975 | Cotter | 358/163 |
| 3,949,162 | 4/1976 | Maleug | 358/213 |
| 4,032,975 | 6/1977 | Malueg et al. | 358/213 |

FOREIGN PATENT DOCUMENTS

1526801  10/1978  United Kingdom .

OTHER PUBLICATIONS

Poetsch, "A Continuous Motion Color Film Telecine using CCD Line", Dec. 78 SMPTE Journal, pp. 815–820.
Childs, "An Experimental Telecine Using a Line-Array CCD Sensor", Apr. 78, SMPTE Journal, pp. 209–213.
Mengers, "Low Contrast Imaging", Oct. 78, Electro-Optical Systems Designs, pp. 20–26.

*Primary Examiner*—Michael A. Masinick
*Attorney, Agent, or Firm*—Gilbert E. Alberding

[57] ABSTRACT

A method and apparatus for compensating for sensitivity variations in image sensors. The sensing surface of an image sensor is arbitrarily divided into a plurality of detection elements. A field of uniform brightness is presented to the image sensor and the video signal from each detection element is multiplied by a corresponding correction value. The altered video signal is compared to a reference and the corresponding correction value is either incremented or decremented so that the altered video signal approaches the reference. During operation, the video data received from each detection element is multiplied by the corresponding correction value to produce corrected video data.

43 Claims, 9 Drawing Figures

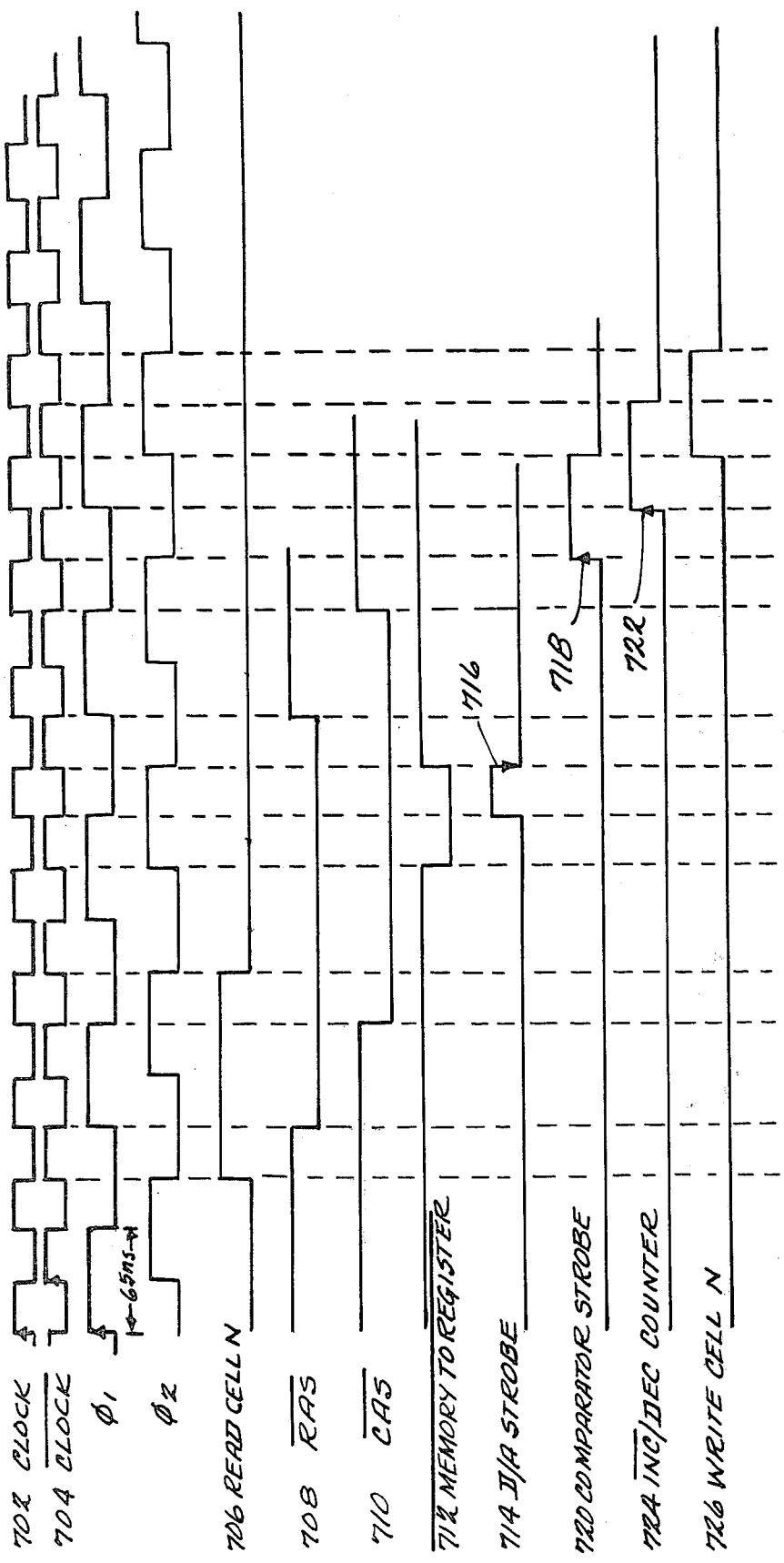

IMAGE SENSOR SENSITIVITY VARIATION COMPENSATOR

This is a continuation of my earlier copending, now abandoned, application Ser. No. 68,468 filed Aug. 21, 1979.

BACKGROUND OF THE INVENTION

The present invention relates to image sensor signal processing, and more particularly to a method and apparatus for compensating for variations in the sensitivity of image sensors.

Television, in the visible spectrum, is playing an increasingly important role in detection and supervision systems and in military applications such as weapons delivery and surveillance. As the range of electro-optical systems increases, as is the present trend, low-contrast performance becomes of paramount importance due to target contrast degradation resulting from atmospheric scattering. Under light haze viewing conditions with an atmospheric extinction coefficient of 0.4 km$^{-1}$, a target of 80 percent contrast is reduced to 1 percent contrast at a range of 10 kilometers.

Manufacturers of silicon diode array vidicons (camera tubes in which a charge-density pattern is formed by photoconduction and stored on an array of photoconductive silicon diodes that are scanned by an electron beam) will not accept specifications on large-area blemishes caused by regional sensitivity differing by less than 5 percent of the nominal sensitivity. FIG. 1 is a photograph of a television screen receiving a signal from an RCA 4532H Silicon vidicon with a fiber optic faceplate. The system is being operated at a high gain. The contrast of the simulated mission targets is 3% at the sensor input. These blemishes are irregular in shape, with sizes ranging up to an appreciable percentage of the raster height. Such local variations are unavoidable in current state of the art silicon sensor technology. As is evident from FIG. 1, when viewing a uniformly illuminated field, these imperfections manifest themselves as coarsely textured, mottled areas on the screen.

Systems tests with high-performance cameras and automatic target trackers have demonstrated that current tracker technology allows performance down to the limit imposed by the sensor mottle which cannot be differentiated from low-contrast signals. Also, such fixed pattern noise has, through psychological testing, been found to significantly impede visual detection. As an example, the average detection time for an object with a lineal extent of 8 percent of the field of view and a contrast of 1 percent was found to increase by a factor of 3.2 with the addition of a 3 percent contrast mottle background. Obviously, these tests were influenced by a number of factors, such as a blemish density, observer motivation, etc. However, the forced response test used does indicate that the observer's task is more difficult with the addition of fixed pattern noise.

To compensate for variations in sensitivity, it is known to arbitrarily divide the sensing surface into a number of small areas, hereafter referred to as elements. A correction coefficient is stored for each element, and the video signal received from each element is processed by the appropriate correction coefficient.

In order to obtain sufficient resolution, the number of elements, and, therefore, the number of correction coefficients, is large. Therefore, in a real time system, the processing of the incoming video signal must be accomplished very quickly.

Furthermore, the compensator must provide sufficient spatial resolution and, should operate independent of scene brightness variations. Another very important parameter in the design of such a compensation device is cost effectiveness. Simply stated, the correction hardward should be affordable by the end user and the benefit realized should be worth the added systems cost.

The technique employed to generate or derive the correction coefficients should suppress or reduce to an acceptable level the effect of thermal noise produced by the sensor and/or its attendant preamplifier. The peak-to-peak thermal noise can easily exceed the blemish amplitude that is being processed out.

One possible video data processing approach is to convert the video data to digital form, operate on the video data with digital techniques and then convert the processed video data back to analog form. However, real time conversion of video data to digital form, is expensive and difficult requiring 8 to 10 bits of gray scale resolution. However, this brute force approach to the problem has been used.

Several other systems are known in the art for compensating for sensitivity variations. An article entitled "A Continuous-Motion Color Film Telecine Using CCD Line Sensors" by Dieter Poetsch in the December 1978 *SMPTE Journal*, describes a system wherein an incoming signal consisting of a data component and a fixed pattern noise component is multiplied by a function related to the inverse of the fixed noise component to eliminate the fixed noise (pp. 818-819). The article does not detail the manner in which the inverse function is generated. However, it is clear that only the raw video signal is sampled to generate the inverse function (i.e., there is no feedback). Furthermore, it appears that the inverse function is generated from a single sampling, after conversion to a digital format.

The present inventor has determined this approach has several inherent drawbacks. First, since it appears that only one sample of raw video data is obtained, the system does not suppress or reduce the effect of thermal noise. Also the analog-to-digital conversion is expensive. Furthermore, since the output of the multiplier is not sampled to alter the correction values, a high degree of accuracy is not obtainable.

An article entitled "An Experimental Telecine Using A Line-Array CCD Sensor" by Ian Childs et al in the April 1978 *SMPTE Journal* discloses another method of compensating for sensitivity variations. As discussed on pages 211 and 212, and as illustrated in FIGS. 10-12, the logarithm of the raw video signal is first obtained. From this logarithmic input signal, a logarithmic signal related to the sensitivity variation pattern is subtracted, and the result is passed through an exponential converter. It is not clear from this disclosure where or even whether analog to digital or digital to analog conversions are made. Furthermore, in order to develop the correction data, it appears that only one sample of input data is obtained and the output of the subtractor is not examined to compare results to an ideal. Thus the results may not be as accurate as necessary, and furthermore, there will be no suppression or reduction of the thermal noise level.

An article entitled "Low Contrast Imaging" by Paul Mengers in the October 1978 *Electro-Optical Systems Designs* describes a method of eliminating fixed pattern noise on page 26. A memory is utilized to store the response of the system to a uniform field input. The pattern is then used as a divisor as each new frame is entered in the processor. The same problems with regard to lack of feedback and no reduction of thermal noise, found in the systems described above, are also present in this system.

BRIEF DESCRIPTION OF THE INVENTION

The present invention overcomes these problems, providing a cost effective system for compensating for image sensor sensitivity variations on a real time basis without compromising system resolution. The effects of overall shading in the sensor system are also overcome. As discussed above, the active raster area of the sensor is arbitrarily subdivided into an array of elements. A correction coefficient, which is related to the variation in sensitivity of each element and which is determined in an initial calibration mode, is applied during each element's active time. The array of elements extend in the raster from $(x_O, y_O)$ to $(x_m, y_n)$. At the time of a particular element $(x_j, y_k)$, the correction coefficient for that element is read from a digital memory and applied to a digital-to-analog (D/A) converter. The output of the D/A converter is then fed to a high-speed analog multiplier to set the instantaneous gain for the incoming raw video signal.

As the $(x_{j+1}, y)$ element is scanned, the corresponding correction coefficient is read from memory and applied to the multiplier through the D/A converter to set the gain for this location. The signal out of the multiplier is utilized as the processed video signal and may be fed to an automatic tracker, a visual display, or the like, depending on the system employed. Thus, the instantaneous gain of the video processing amplifier is modified to compensate for the actual variation in sensor sensitivity at that particular element location. This process is executed for each element location in the raster and is repeated each frame.

The correction coefficients are derived in a self-calibration mode, during which the sensor is presented with a field of uniform brightness. As a particular element $(x_j, y_k)$ is scanned by the electron beam in the camera, the raw video signal is applied to a multiplier. Toward the end of an element period, a comparator circuit decides whether the real time, processed signal from the multiplier output is greater or less than a reference signal. An indexing register, temporarily storing the $(x_j, y_k)$ correction coefficient, is then either incremented or decremented and the adjusted correction coefficient value is returned to memory location $(x_j, y_k)$. The correction coefficient is altered in such a way that the processed video data approaches the reference signal. The next time that the electron beam sweeps through the particular element the coefficient is again drawn from memory and applied to both the multiplier and the indexing register. The multiplier output is again tested with respect to the reference signal and the indexing register either increments or decrements the correction coefficient.

During the initial phase of the calibration cycle, the indexing circuit allows the correction coefficient stored in digital form in the memory to be incremented or decremented by 1 least significant bit to facilitate rapid convergence. Recursive filter action is achieved by accumulating the indexing decision in additional memory sites over many samples while holding the correction coefficient for each element constant. When a number of sufficient magnitude has been accumulated in the additional memory sites, the correction coefficient is allowed to change by 1 least significant bit. The magnitude at which the change is allowed to occur may be altered as a design parameter.

With the above technique, the effect of thermal noise on the correction coefficients can easily be reduced to a negligible amount. Due to the speed at which digital to analog conversions and analog multiplications can be performed, the system operates on a real time basis. The feedback provided by the comparison of the output of the multiplier with a reference enhances the accuracy of the system. The bandwidth of the system is limited only by the bandwidth of the analog multiplier, and analog multipliers of suitable bandwidth are readily available.

Furthermore, since no direct conversion of the video signal to the digital domain is involved, no aliasing components (a low frequency beat pattern associated with sampling) result from sub-Nyquist sampling, thus allowing a correction coefficient array of minimal size consistent with the range of blemish sizes.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which:

FIG. 7 is a timing diagram illustrating the operation of logic and address control 120 of FIG. 3;

DETAILED DESCRIPTION OF THE PREFERRED EMBODIMENT

Figure 2:
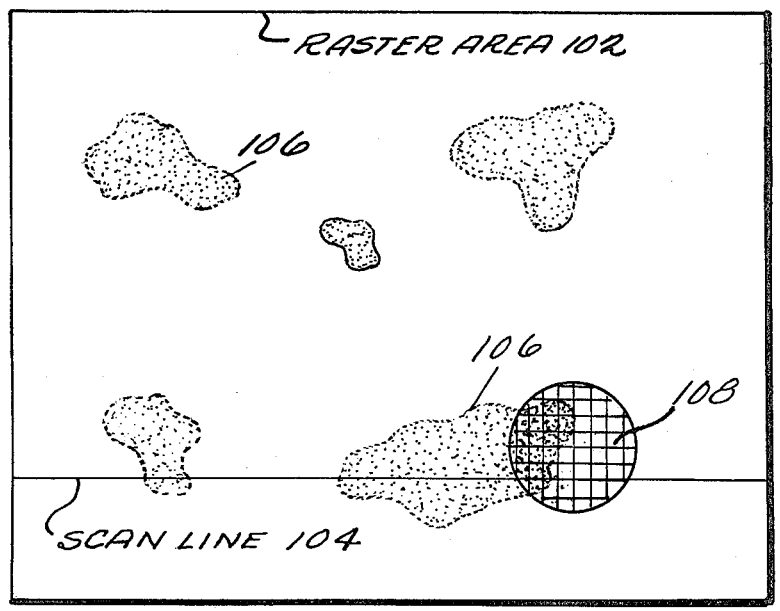
FIG. 2 is a schematic of a television raster and the elements thereof.

FIG. 2 represents the photosensitive surface of an image sensor, with rectangle 102 defining the outline of a raster (the predetermined pattern of scanning lines, such as scan line 104, that provides substantially uniform coverage of an electron beam device). Areas 106 depict mottling caused by sensitivity variation in areas of the photosensitive surface when the image sensor is directed at a uniformly bright field.

Figure 3:
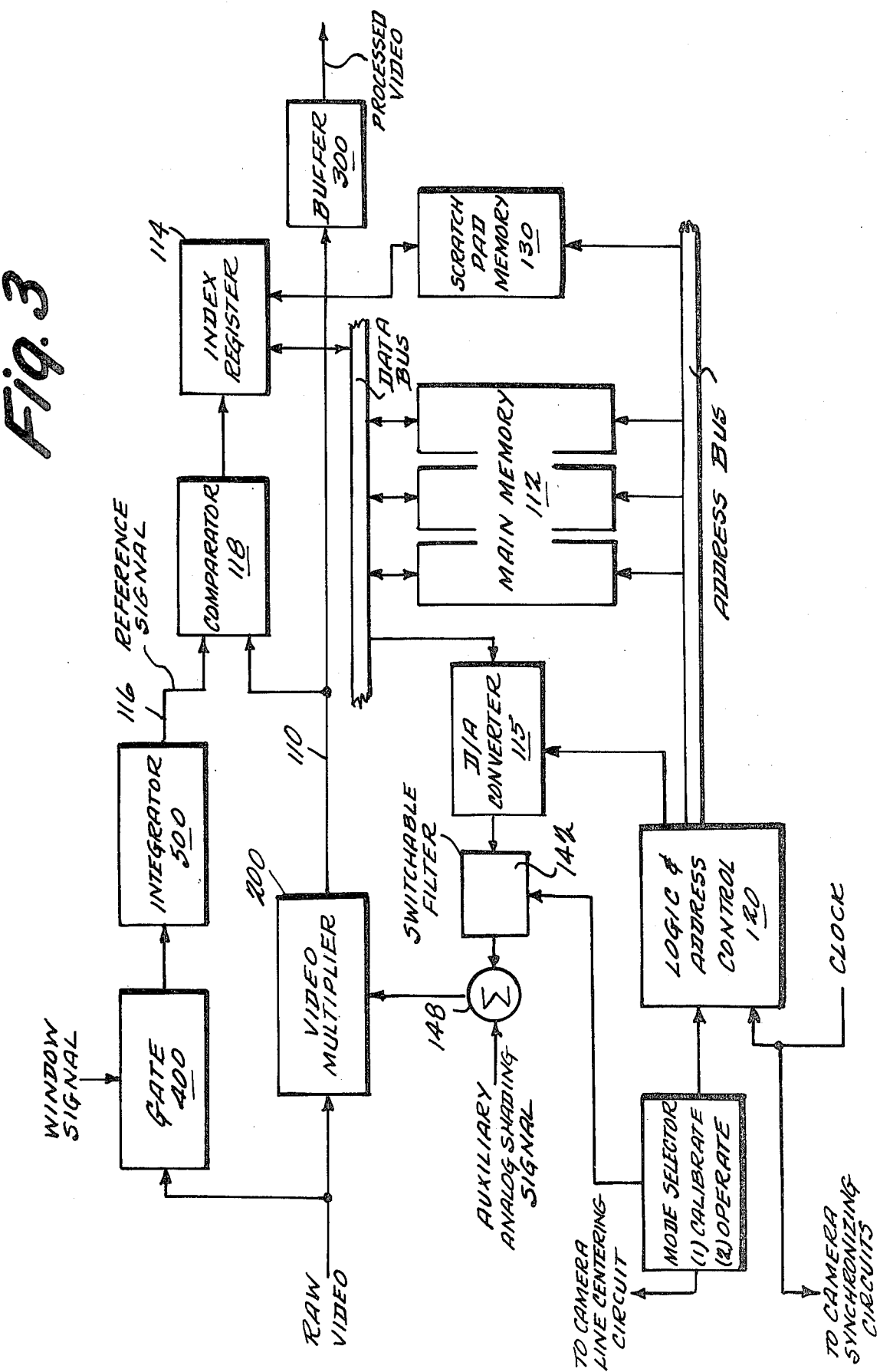
FIG. 3 is a functional block diagram of one preferred embodiment.

FIG. 3 illustrates a functional block diagram of the preferred embodiment for processing the video signal from each element 108 (see FIG. 2) to eliminate mottled areas 106. In operation, video data from each element 108 is applied to video multiplier 200. At the same time, a correction coefficient related to the particular element is read out of main memory 112 and applied to digital to analog (D/A) converter 115. Multiplier 200 produces a signal on line 110 related to the product of the video data from the particular element 108 and the corresponding correction coefficient from memory 112.

Multiplier 200 is an analog multiplier accepting analog video data and the analog form of the correction coefficient from D/A converter 115 to produce an analog compensated video signal on line 110. This signal is applied to buffer 300, the output of which is processed video data which may be directed to a visual display, tracker device, or the like.

In order to calibrate the device, i.e., generate the correction coefficients, the image sensor is directed at a field of uniform brightness. This may be accomplished by pointing the image sensor at a white card or a clear area of the sky, or a diffuser may be momentarily switched into the optical path of the image sensor to produce a field of uniform brightness at the focal plane. The video signal received from such a uniform field should obviously be uniform. However, because of sensitivity variations the video data is not uniform. The purpose of the calibration period is to generate an MxN array of correction coefficients by a series of trial comparisons to compensate for these variations.

To this end, the output of multiplier 200 is compared to a reference signal on line 116 in comparator 118. The reference signal is a DC level indicative of the desired response, or, alternatively, an average of the input video signal as generated by gate circuit 400 and integrator 500. Comparator 118 decides whether the signal on line 110 is less than or greater than the reference signal on line 116 for the particular element 108 being evaluated.

While the video data is being applied to multiplier 200 and the comparison is being made, the correction coefficient for the particular element 108 under study is also applied to index register 114. The outcome of the decision made by comparator 118 is employed to increment or decrement the correction coefficient in index register 110 by 1 least significant bit. The revised correction coefficient is then returned to memory 112 and is again accessed just prior to the next scan through the particular element 108.

The accessing of memory 112 is controlled by a suitable address controller 120 that serves to maintain the proper timing synchronism with the camera scan. Such memory address controllers are well known in the art.

The next time that data is received from the particular element 108, the updated correction coefficient is retrieved from memory 112 and applied through D/A converter 115 to video multiplier 200. The output of multiplier 200 is again compared to the reference signal on line 116 and the correction coefficient is incremented or decremented in index register 114. Index register 114 can simply be a binary up/down counter. A suitable circuit can be constructed with two Signetics 542S169A counters.

A suitable memory 112 for the correction coefficients can be constructed of a plurality of 16K×1 dynamic random access memories (RAMS) such as the Intel 4116-02. In the preferred embodiment, the correction coefficient is represented by 7 bits. Seven such memories are connected in parallel so that one digit of a particular correction coefficient is stored in each of the memories.

For an 875 line, 30 frame per second television system having a 4:3 aspect ratio, an array of 240×203 correction coefficients is a reasonable compromise between grid size and speed, still providing an adequately fine array of elements 108. Employing elements of this size, the edge gradient of a typical large-area blemish (i.e., the transition from the presence of the blemish to the absence of a blemish) occupies on the order of two elements 108.

The processing of adjacent areas of contiguous scan lines by the same correction coefficient produces satisfactory results. An array of 240×203 correction coefficients can compensate for the typical 812 active lines of scanning by allowing each element 108 to be four lines in height. A typical television system employs a 2:1 interlace system so that on one pass, alternate (or even) lines are scanned while on the next pass the remaining (or odd) lines are scanned. When each element is four lines in height, two of the lines are in the even field and two of the lines are in the odd field (a standard television frame consists of two interlaced fields, one field [the even field] containing alternate scan lines, the other field [the odd field] containing the interspersed scan lines). If the active line time of the video signal is divided into 240 elements, the dwell time of each element is on the order of 130 nanoseconds (ns.). This dwell time is less than the access time of the fastest available dynamic RAMS. To accommodate such short times, the well known technique of time multiplexing is employed.

In this multiplexing scheme, memory 112 comprises three cells. The first correction coefficient to be accessed is stored in cell "0", the second correction coefficient to be accessed is stored in cell "1" and the third correction coefficient is stored in cell "2". The fourth correction coefficient to be accessed is stored in cell "0", etc. With the memory configured in three cells, the access time for any particular cell is increased to 3×130 ns.=390 ns. Logic and address control 120 controls the addressing of the three cells in memory 112.

During the calibration period, not only is a number pulled from main memory 112, but also, this number is written in index register 114, incremented or decremented, and written back in memory 112. A 390 ns. interval has been found to be too short to reliably accomplish the necessary chain of events for the read-decision-write sequence. Rather than increasing the number of memory cells, only a portion of the correction coefficients are calculated in one set of fields (sets of scans through the raster area). Specifically, correction coefficients for alternate elements (even-numbered elements) in cell "0" of main memory 112 are converged first. Then, the correction coefficients of the odd-numbered elements in cell "0", followed by the correction coefficients of the even-numbered elements of cell "1", the correction coefficients of the odd-numbered elements of cell "1", the correction coefficients of the even-numbered elements of cell "2" and the correction coefficients of the odd-numbered elements of cell "2" are the each converged consecutively. During the calibration mode, only the particular elements being calibrated are accessed. That is, during calibration of the even-numbered elements of cell "0", only the even elements of cell "0", and not the other intervening elements are accessed. For example, when the correction coefficients of the even-numbered elements of cell "0" are being converged, after a particular cell is accessed for multiplication, comparison and indexing, the next correction coefficient to be updated (the next even correction coefficient of cell "0") is not accessed until six 130 ns. time periods later, providing a 780 ns. interval for the read-decision-write sequence.

To shorten the calibration period, each correction coefficient in main memory 112 is initialized to "1" for the most significant bit followed by all zeros. Employing a 7 bit correction coefficient so initialized, a minimum of 64 trials will cover the entire dynamic range when the correction coefficient can change 1 least significant bit per trial. In the preferred embodiment, 72 trials are used to converge each correction coefficient to the approximate value, reducing the effect of thermal noise.

Figure 6:
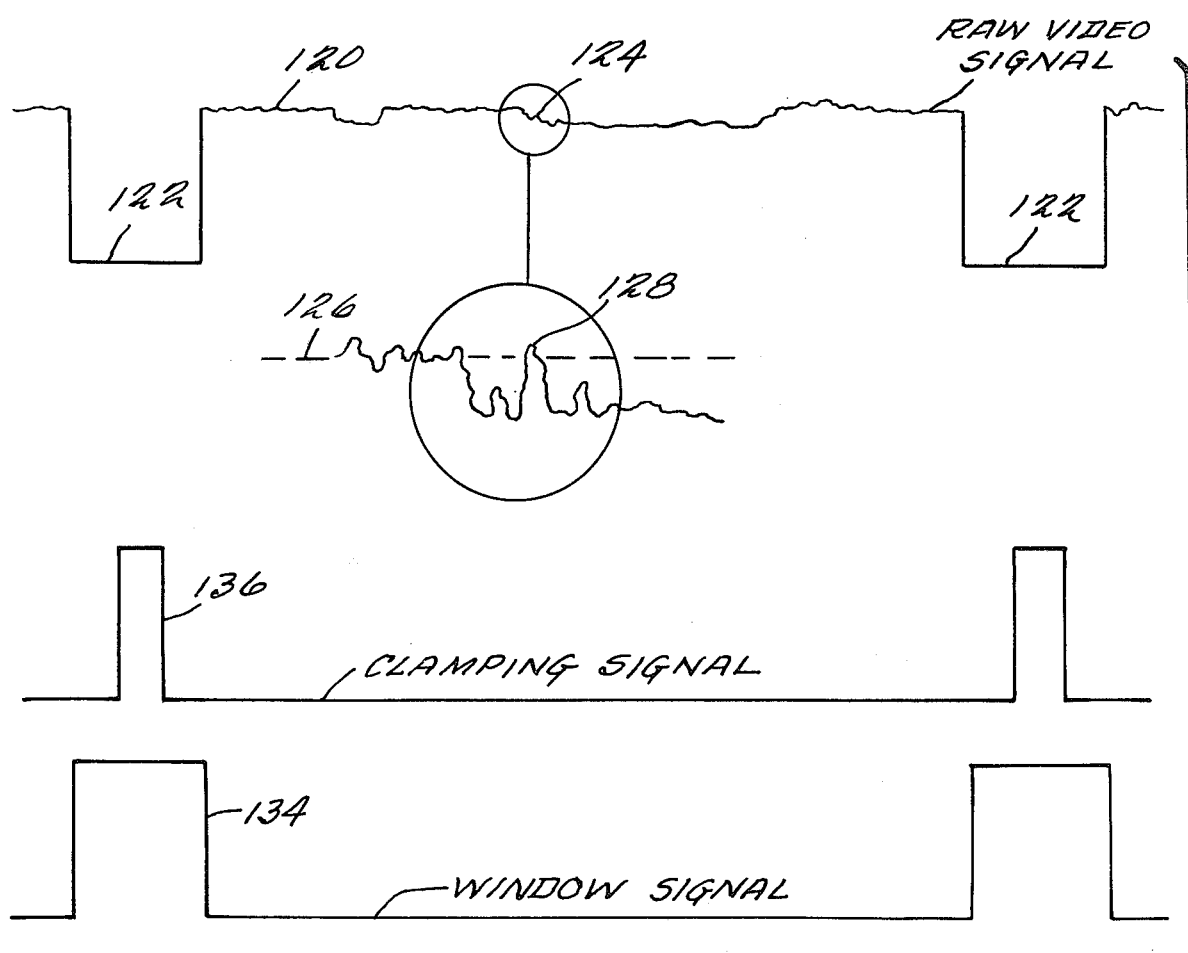
FIG. 6 illustrates basic video waveforms.

FIG. 6 illustrates a typical video waveform 120 with blanking period 122, and sensitivity variation decayed portion 124. Line 126 represents the ideal signal with uniform sensor sensitivity and no noise. Noise spike 128 exceeds the desired nominal response 126, even though the signal, due to a lower sensitivity of the particular sensor portion, is less than the nominal level. Such noise perturbations exist even with the best signal-to-noise ratio achievable in practical camera systems.

When the element containing noise spike 128 is compared with the refernce signal, the correction coefficient will be changed so as to decrease the gain of multiplier 200. This is a wrong decision, since the sensitivity of the particular element is less than the average. Thus, the device would make the wrong decision by decreasing the gain when actually a gain increase is needed. Thus, if only one trial were employed to set the correction coefficient, the correction coefficient would be in error. By gradually converging on the proper correction coefficient over a series of trials, this problem is alleviated. The probability of making a second wrong decision in the same direction is reduced for the next trial. This is a result of the fact that the first wrong decision offsets or skews the probability distribution function, Gaussian noise distribution assumed. Three wrong decisions are less likely than two, etc. Thus, the correction coefficient rapidly converges to the correct value within some error range with a standard deviation considerably less than the peak-to-peak noise.

After the rapid convergence period discussed above consisting of 72 trials at each element location in the M×N array, a second period of comparisons further averages the correction coefficients. In this second period, scratch pad memory 130 is employed to store an intermediate value comprised of four more bits for each correction coefficient being converged. In effect, these intermediate values are employed as the 4 least significant bits of the correction coefficient. For this second averaging period, index register 114 is expanded by suitable switching circuitry to connect an additional 4 bits of binary up/down counter to the previous seven bits in the well known "look-ahead carry" configuration.

For each correction coefficient, the entire 11 bit code is accessed and stored in index register 114. The decision of comparator 118 increments or decrements the least significant bit of the 4 bit intermediate value stored in memory 130. When an intermediate value stored in scratch pad memory 130 increments to all ones or decrements to all zeros, a change in the intermediate value stored in scratch pad memory 130 in the same direction causes the least significant bit stored in main memory 112 to either be incremented or decremented, respectively.

As with the first, fast convergence period, each element is examined in the second calibration period for 72 trials, with all of the even-numbered elements within cell "0" being calibrated before calibration of all of the odd-numbered elements within cell "0", etc.

Since each storage location in memory 130 is also initialized to an intermediate value of "1" for the most significant bit followed by zero, 7 counts up or 8 counts down must be accumulated before the correction coefficient stored in main memory 112 is permitted to change by 1 least significant bit. After the first change in the least significant bit of main memory 112, 16 counts up or down must be accumulated in scratch pad memory 130 before a second 1 least significant bit change to the correction coefficient is made in main memory 112. The net result of this recursive action is to significantly filter the perturbing influence of thermal noise to a negligible level.

This threshold of 7 or 8 bits for the first change in the least significant bit in main memory 112, followed by a 16 bit change prior to the next change in the least significant bit of main memory 112, was selected in the preferred embodiment based on a computer simulation. The improved achieved recursively must be weighed against the cost of additional memory space and calibration time. With the above technique, the effect of thermal noise on the correction coefficients can easily be reduced to a negligible amount.

The calibration scheme as described above can be done on the bench, or any time prior to use. Obviously, the accuracy of the results are improved as the time of calculation approaches the time of use.

Figure 4:
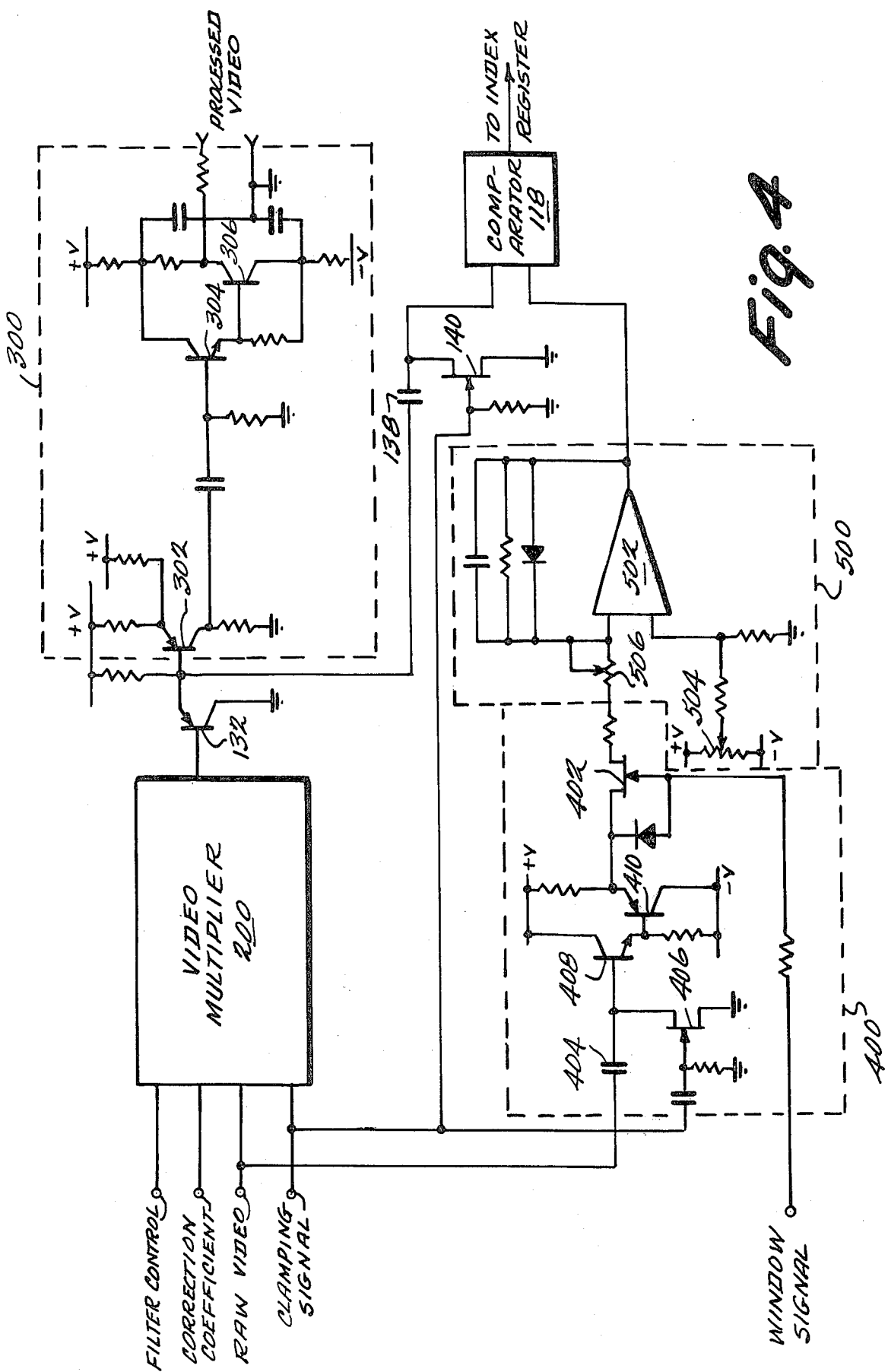
FIG. 4 is a circuit diagram of the comparison portion of the circuit of the preferred embodiment.

As illustrated in FIG. 4, the output of video multiplier 200 is buffered by transistor 132 connected in emitter-follower configuration. The output of transistor 132 is applied to comparator 118. Any suitable comparator may be employed such as Signetics A710 high-speed comparator. The output of transistor 132 is also applied to buffer 300. Transistor 302 of buffer 300 inverts the signal from multiplier 200. Transistors 304 and 306 along with resistor 307 forms a source terminated cable driver.

As indicated above, a reference signal is generated by gate 400 and integrator 500. Gate 400 passes the raw video signal to integrator 500 as controlled by the window signal. As illustrated in FIG. 6, the window signal comprises pulses 134 which correspond in period and phase to blanking periods 122. As integrator 500 averages the video signal, it is undesirable that the blanking period of the video signal be incorporated in the average. All that is really of interest is the portion of the video signal which transmits data. Therefore, the window signal switches field effect transistor 402 of gate 400 so that the raw video signal is not applied to integrator 500 during blanking periods.

Capacitor 404 AC couples the raw video signal to gate circuit 400. In order to set the DC or "black" level (i.e., the signal level when a black field is presented to the image sensor) field effect transistor 406 is provided to discharge capacitor 404. Transistor 406 is controlled by a clamping signal. As illustrated in FIG. 6, the clamping signal consists of pulses 136 which lie within blanking period 122. Therefore, during each blanking period, capacitor 404 is discharged.

The video signal, after passing through capacitor 404, is amplified by transistors 408 and 410 connected in a common configuration. The video signal passing through transistor 402 is applied to integrator 500 which consists of operational amplifier 502 connected in a commonly known integrating configuration. Variable resistor 504 adjusts the DC bias of integrator 500, while variable resistor 506 controls the gain.

Since capacitor 138 AC couples the output of video multipler 200 to comparator 118, field effect transistor 140 is employed to set the DC "black" level on the comparator 118 side of capacitor 138. Transistor 140 is also controlled by the clamping signal comprising pulses 136.

Figure 5:
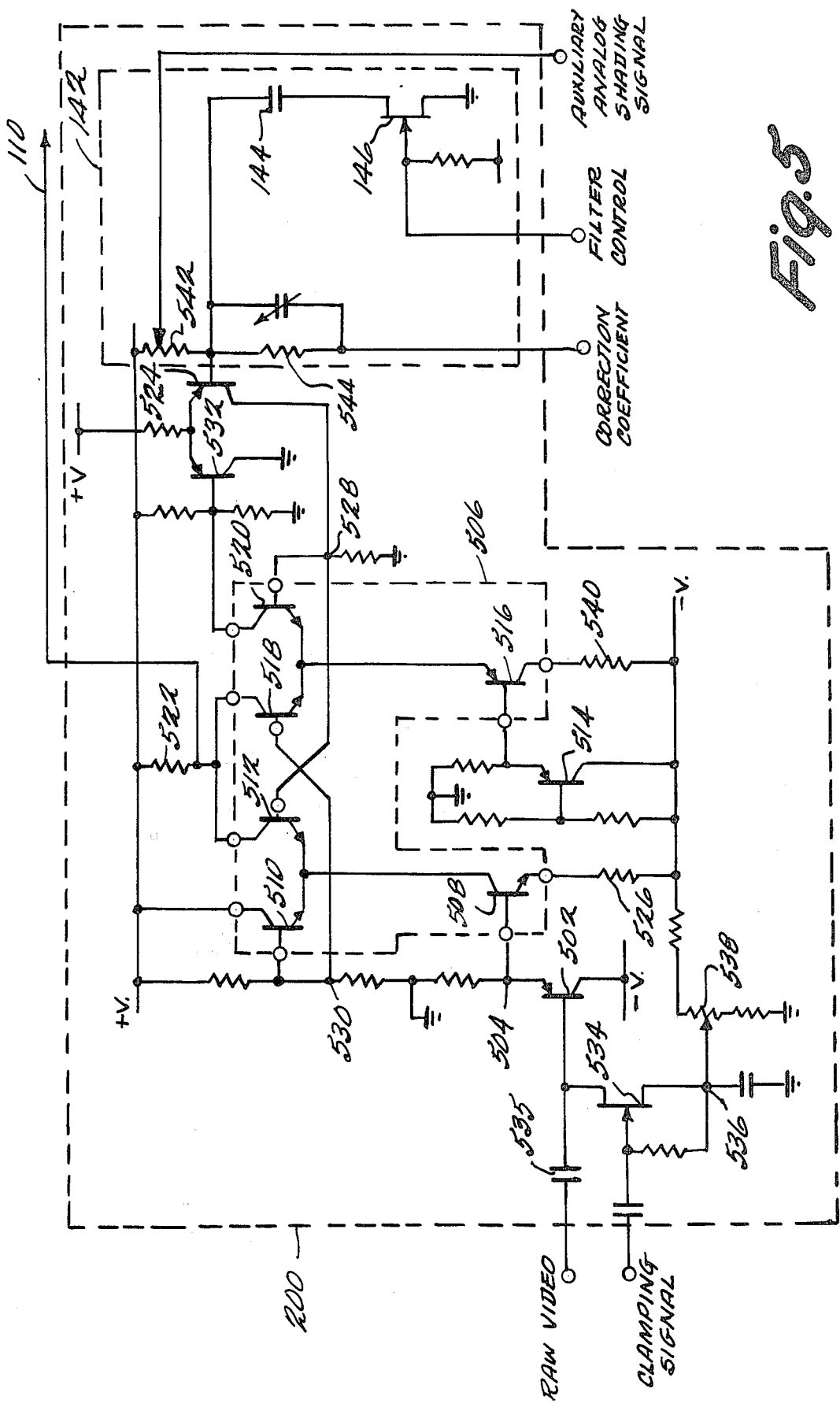
FIG. 5 is a circuit diagram of the multiplier of the preferred embodiment.

The bandwidth and response time of multiplier 200 are key parameters for a successful operation As indicated above, multiplier 200 operates in an analog format. Since the typical video signal has a bandwidth of 15 MHz, this is the minimum acceptable bandwidth for amplifier 200. A suitable amplifier is illustrated in FIG. 5. The raw video signal is applied to the base of transistor 502. Transistor 502 is biased so that the raw video signal controls the voltage at point 504. The heart of multiplier 500 is dual differential amplifier 506. Transistor 508 supplies current for transistors 510 and 512 connected as a differential amplifier. Transistors 514 and 516, together with related biasing resistors form a constant current source for transistors 518 and 520 also connected as a differential amplifier. The video signal controls the voltage at point 504, to which the current flowing through transistor 508 is related.

The current flowing through the collector of transistor 512 also passes thrrough resistor 522. The collector current through transistor 512, and therefore the voltage drop across resistor 522 is related to the collector current through transistor 508. The output signal on line 110 represents the voltage drop across resistor 522.

A voltage from D/A converter 115, related to the correction coefficient, is applied to the base of transistor 524. The current flowing through transistor 524 drives transistors 512 and 520. As is well known in the art, as the current through one transistor of a differential amplifier increases, the current through the other transistor of the differential amplifier decreases. Thus, as the voltage related to the correction coefficient varies, the current flowing through, and therefore, the voltage cross resistor 522 varies. Transistor 532 provides feedback for transistor 524 to linearize the effect on the output of changes in the voltage representative of the correction coefficient and to greatly reduce the thermal sensitivity of the circuit.

Analysis has determined that the output voltage is as follows:

$$V_{out} = R_{522}\left[I_{bias} + \frac{V_{in}}{R_{526}}\left(\frac{e^{\frac{V}{AKT/q}}}{1 + e^{\frac{V}{AKT/q}}}\right)\right]$$

where
$V_{out}$=Voltage across R552
$V_{in}$=Raw Video Signal
$I_{bias}$=Current through Transistor 516
V=Voltage at point 528 less the voltage at point 530
K=Boltzman's constant=$1.380 \times 10^{-23}$ joules/°K
T=absolute temperature
q=electron charge=$1.602 \times 10^{-19}$ coulombs
A=an empirical constant typically ranging between 1 and 2.

It is particularly advantageous that dual differential amplifier 506 be located on a common substrate for purposes of thermal matching and tracking. A suitable device for dual differential amplifier 506 is dual differential amplifier CA2036 manufactured by RCA.

Capacitor 535 AC couples the raw video signal to the base of transistor 502. To set the D.C. "black" level on the transistor 502 side of capacitor 535, pulses 136 of the clamping signal turn on field effect transistor 534 so as to apply the voltage at point 536 to the base of transistor 502. Since transistor 502 controls transistor 508, the voltage at point 536 controls the current flowing through transistor 508 when transistor 534 conducts. In calibrating the circuit, potentiometer 538 (and therefore the voltage at point 536) is adjusted so that during the blanking period and when the sensed field is black (the signal level is the same), the current flowing through resistor 526 equals the current flowing through resistor 540.

When the current flowing through resistors 526 and 540 are equal, the circuit is in balance. When a black field is presented to the sensor, an increase in the current through transistor 512, caused by a change in the voltage corresponding to the correction coefficient, is offset by an equal decrease in the current through transistor 518. Thus, when a black field is presented to the sensor, no component of the voltage corresponding to the correction coefficient appears in the output signal on line 110.

The dynamic range of multiplier 500 can easily be scaled by the appropriate choice of resistors 542 and 544. The difference in sensitivity over the photosensitive area of a high quality silicon vidicon camera can be ±15 percent, blemishes plus shading. Thus, resistors 544 and 542 should be chosen so that the maximum change in the voltage corresponding to the correction coefficient produces a 30 percent change in the output signal on line 110. If resistors 542 and 544 are so chosen, then a change of one unit in the least significant bit of the 7 bit correction coefficient will produce a change of approximately 0.25 percent in the output signal on line 110.

FIG. 7 is a timing chart of the events described above which occur during the calibrating period. The sequence illustrated in FIG. 7 represents the operations necessary for a single update of a single correction coefficient. Thus, during calibration, the pattern of events illustrated in FIG. 7 would first occur for the first even element of cell "0". This chain of events would then be repeated for the next even element in cell "0" 780 ns. later. This process would continue for the rest of the even elements in cell "0" and then the pattern would repeat until each even element has been updated the requisite number of times (in the preferred embodiment, 72 trials in the first, fast, convergence period). After the even elements of cell "0" are converged, the odd elements of cell "0" would then be converged, etc. This procedure would then be repeated for the second, averaging, convergence period.

From clock pulse 702 in FIG. 7, and its complement 704, all the required waveforms and timing pulses are generated by conventional and well known circuit means in logic and address control 120. Read Cell N signal 706 primes the particular main memory 112 used in the preferred embodiment. Memory Row Address Strobe, $\overline{RAS}$ 708, and Column Address Strobe, $\overline{CAS}$ 710 serve to access the selected element location in memories 112 and 130. Memory to Register Strobe 712 parallel loads the correction coefficient just accessed into index register 114. The D/A Strobe 714 loads the coefficient into digital-to-analog converter 115. On falling edge 716 of D/A Strobe 714, as delayed by a propagation delay of approximately 40 ns., the digital correction coefficient is converted to an analog voltage and is supplied to video multiplier 200. This voltage establishes the instantaneous gain of multiplier 200 after a multiplier response delay of approximately 30 ns. At rising edge 718 of Comparator Strobe 720, the output of comparator 118 is fixed by a D-type flip-flop. Index register 114 is clocked by rising edge 722 of INC/DEC Counter Strobe 724. Write Cell N Strobe 726 causes the incremented or decremented content of index register 114 to be written back into the proper memory location in memories 112 and 130.

The following table indicates the length of time necessary to perform calibration. Keep in mind that a complete set of scan lines, a frame, comprises two scanning passes, two fields. In each frame, all of the even lines are scanned in the first field and all of the odd lines are scanned in the second field. Also keep in mind that each element 108 has a height of four scan lines, two even lines and two odd lines. Thus in a single field, the correction coefficient for each element is updated twice.

| CALIBRATION PERIODS | |
|---|---|
| Initial memory and scratch pad = | 1 field |
| Fast Converge: | |
| Cell 0 even = 72 trials; 2 per field = | 36 fields |
| Cell 0 odd = | 36 fields |
| Cell 1 even = | 36 fields |
| Cell 1 odd = | 36 fields |
| Cell 2 even = | 36 fields |
| Cell 2 odd = | 36 fields |
| | 216 fields |
| Fine Converge: | |
| Cell 0 even = 72 trials; 2 per field = | 36 fields |
| Cell 0 odd = | 36 fields |
| Initialize scratch pad = | 1 field |
| Cell 1 even = | 36 fields |
| Cell 1 odd = | 36 fields |
| Initialize scratch pad = | 1 field |
| Cell 2 even = | 36 fields |
| Cell 2 odd = | 36 fields |
| | 218 fields |
| TOTAL 435 fields, or 7.25 seconds | |

The total memory capacity required is 240×203=48,720 elements. Using seven 16K RAMS connected in parallel for each cell of memory 112, with each byte forming a correction coefficient of 7 bits, the available capacity is 16,384×3=49,152 bytes which is in slight excess of that required.

The refresh function for the dynamic RAMS can easily be accomplished by exercising a specific number of addresses each line blanking interval 122 in FIG. 6. To accomplish the refresh function, circuitry well known in the art may be employed.

In the operating mode, correction coefficients are accessed from memory 112, and through D/A converter 115, are applied to multiplier 200 to program the instantaneous gain. A total of 194,880 individual gains (204 elements per line × 203 lines per frame × 4 individual gain settings per element) are set per frame. This is repeated each 1/30th of a second.

Figure 1:
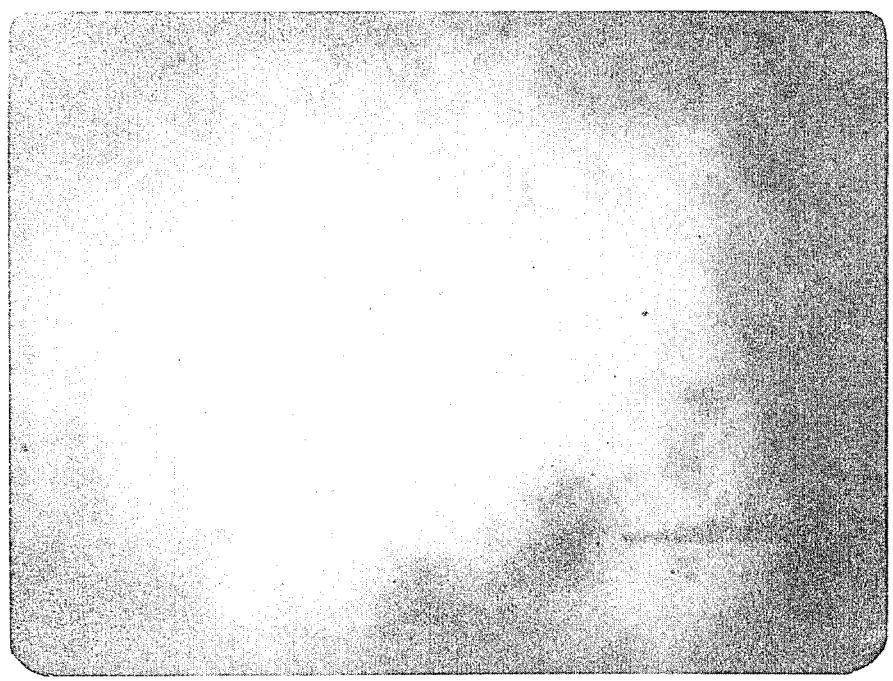
FIG. 1 is a photograph of a television screen receiving a signal, without processing, from an RCA 4532H silicon vidicon with 3 percent contrast simulated targets 2.
Figure 8:
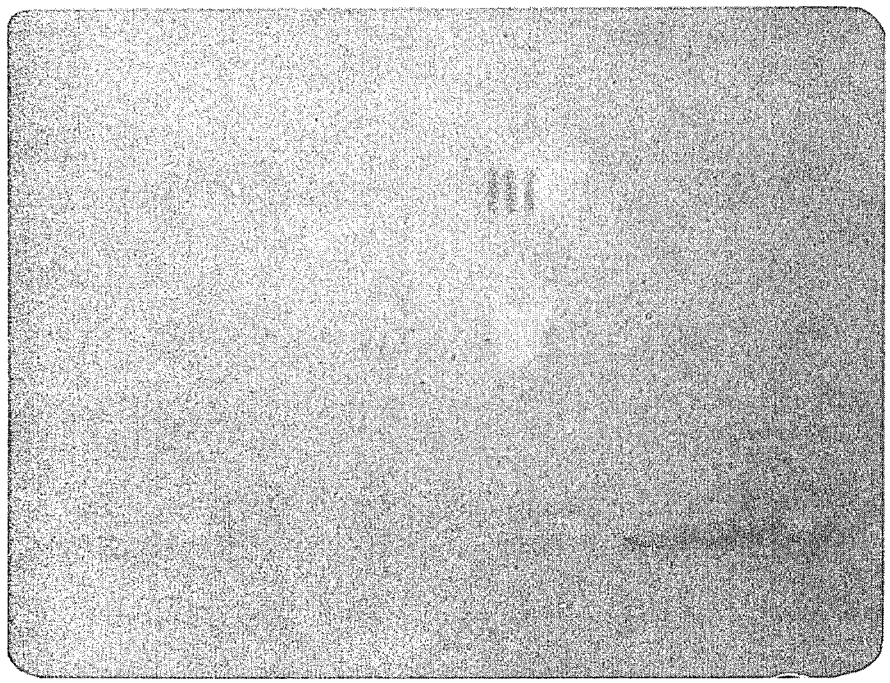
FIG. 8 is a photograph of a television screen receiving a signal, after processing, from an RCA 4532H with 3 percent contrast targets.

FIG. 8 is a photograph of a television screen receiving the same video signal as the television screen of FIG. 1, except that the video data has been processed by the preferred embodiment of the invention. The dramatic removal of the large area blemishes and shading is readily apparent. Multiplier 200 has compensated for the differential sensitivity of each element 108 in the image sensor.

The propagation or response delays of digital-to-analog converter 115, multiplier 200 and comparator 118 necessitates the increment/decrement decision to be made at the end of a particular element dwell time. In the operate mode, when the correction coefficients are "played back", it would be desirable to more or less position the point at which the correction coefficients was determined in the center of the appropriate element. Such a recentering would result in a minimization of any residual artifacts on a steep-edge gradient. For example, if the video signal through a particular element increased linearly, and the correction coefficient was determined from the signal at the end of the particular element. Upon playback, the gain at the first portion of the element would be low and would approach the proper value at the end of the element. In order to minimize the overall error, it is preferable that the point at which the correction coefficient is determined is in the center of the element so that the gain at the beginning of the element would be slightly low, the gain in the center of the element would be correct, and the gain at the end of the element would be slightly high. This centering can easily be accomplished by implementing a slight shift in the line centering of the TV camera by switching in a preset value of the correct polarity and amplitude. An alternate method would be to change the phase between the camera line timing signals and the correction coefficient. Either of these methods could be easily accomplished by one skilled in the art.

After the correction coefficients are generated as described above, filter 142 as illustrated in FIG. 3 can be switched into the circuit between D/A converter 115 and multiplier 200. As illustrated in FIG. 5, filter 142 is a simple single pole RC filter comprised of capacitor 144 and the parallel combination of resistors 542 and 544. This filter can be activated by any suitable means such as field effect transistor 146 as controlled by a filter control signal. This filter attenuates any digital clock feed-through that is present on the output of D/A converter 115. A suitable time constant for filter 142 would be on the order of one-half the element dwell time, or 65 ns. for the disclosed embodiment. Such a filter would introduce phase shift or delay which could easily be compensated for by the same method as the element centering described above. It is not desirable to incorporate such filtering during the calibration period, since the time delay caused by the filter could not be tolerated.

The range of correction that must be stored in memory 112 can be reduced by introducing an analog shading signal such as a combination of field and line rate parabolic waveforms to correct for the optical and electromagnetic imperfections of the system. As indicated in FIG. 3, the auxiliary analog shading signal may be summed with the output of D/A converter 115 in summing device 148. The output signal of summer 148 is applied to video multiplier 200. The analog correction waveform serves to compensate for basic shading introduced, for example, by electron optics, the attendant optical system, etc.

Figure 9:
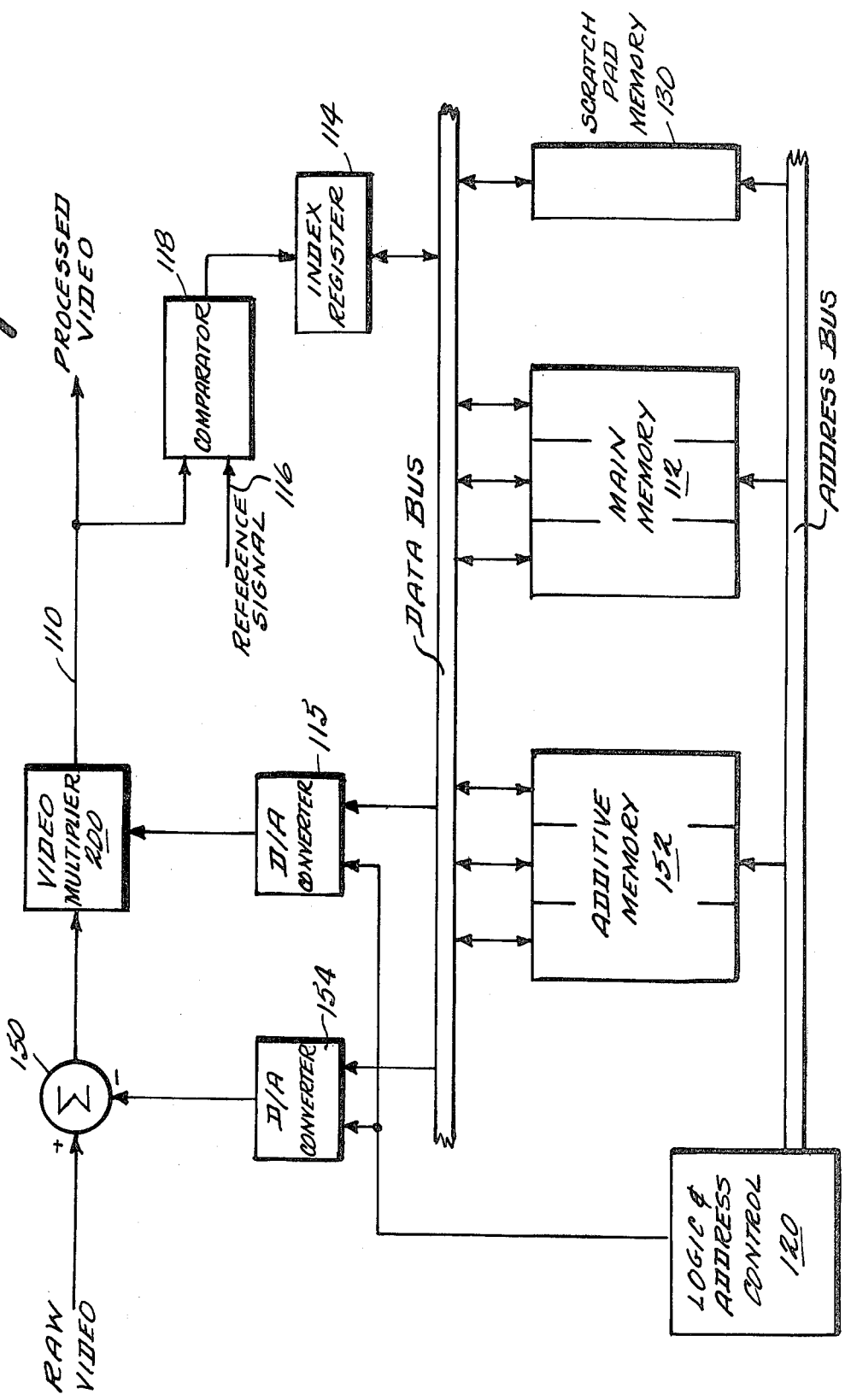
FIG. 9 is a functional block diagram of an alternative embodiment with an additive noise compensation circuit.

A fixed or additive component such as dark current can be compensated for by preceding multiplier 200 with subtractor 150 as illustrated in FIG. 9. Components in FIG. 9 similar to components illustrated in previous FIGURES are assigned the same reference number.

Dark current is the current produced by the image sensor when a black field is presented to the photosensitive surface of the multiplier. Memory 152 is added to main memory 112 to store additive correction coefficients. In the calibration mode, the additive coefficients are derived in the same manner as discussed above with respect to the correction coefficients, only with the lens capped. The multiplicative correction coefficients are then derived with the sensor illuminated. D/A converter 154 converts the additive correction coefficients from additive memory 152 to analog form for subtraction from the raw video. Much of logic and address control 120 and scratch pad memory 130 can be utilized with both additive memory 152 and main memory 112. The combination of additive and multiplicative compensation produces a real time signal $x' = m + b$.

The compensator in the preferred embodiment is described in combination with a silicon vidicon camera system operating at low-contrast viewing conditions. However, the disclosed real time video signal processing technique has applications for many types of sensors. For example, when used with a CCD sensor (charge coupled device sensor), the multiplicative correction coefficients could be stored in a nonvolatile memory since the sensitivity nonuniformity of CCD sensors is positionally invariant (no analog sweep circuits).

Although only a few exemplary embodiments of this invention have been described in detail above, those skilled in the art will readily appreciate that many modifications are possible in the exemplary embodiments without materially departing from the novel teachings and advantages of this invention. For example, instead of an image sensor with a two dimensional photosensitive surface, the present invention would easily be employed with a line of detectors. The present invention is suitable with any type of sensor for sensing any type of radiation, in addition to the embodiment discussed above in which visible light is detected.

Accordingly, all such modifications are intended to be included within the scope of the invention as defined in the following claims.

What is claimed is:

1. A method of compensating for sensitivity variations in an image sensing device, said image sensing device including a plurality of detection elements, said method comprising the steps of:
    determining the sensitivity variation in each of said detection elements;
    storing a correction value for each detection element related to said variation in a memory;
    retrieving each correction value from said memory;
    converting each said correction value to analog form; and
    altering an analog signal related to the image sensed in each of said detection elements by the corresponding correction value, thus producing corrected video data, said altering step further including the step of scaling the analog form of said correction value so that the maximum correction value capable of being stored in said memory corresponds to the maximum deviation in sensitivity of said image sensing device.

2. A method of compensating for sensitivity variations in an image sensing device, the sensing surface of said image sensing device being divided into a plurality of detection elements, said method comprising the steps of:
    determining the sensitivity variation in each of said detection elements;
    generating a correction value for each detection element related to said variation;
    altering video data received from each of said detection elements by the corresponding correction value; and
    filtering high frequency components from said correction values.

3. A method as in claim 1 or 2 wherein said altering step comprises the step of multiplying said video data received from each of said detection elements by the corresponding correction value.

4. A method as in claim 2 wherein said generating step comprises the steps of:
    storing said correction value for each detection element in a memory;
    retrieving a correction value from said memory; and
    converting said correction value to analog form.

5. A method as in claim 2 wherein:
    said determining step comprises the steps of presenting a field of uniform brightness to said image sensing device, and comparing said altered video data with a reference; and
    said generating step further comprises the step of altering each correction value in response to said comparing step so that said altered video date approaches said reference.

6. A method as in claim 2 wherein said generating step comprises:
    altering each of a plurality of intermediate values in response to said determining step, each intermediate value corresponding to a detection element; and
    altering the corresponding correction value when said intermediate value becomes a predetermined magnitude.

7. A method of compensating for sensitivity variations in an image sensor, said image sensor including an array of detection elements, said method comprising the steps of:
    a. presenting a uniformly bright field to said image sensor;
    b. sequentially retrieving a correction value for each of said detection elements from a memory;
    c. altering video data from each of said detection elements by the corresponding correction value to produce an altered signal;
    d. integrating said altered signal to form a reference signal;
    e. comparing said altered signal with said reference signal;
    f. altering said corresponding correction value in response to said comparing step to cause said altered signal to approach said reference signal;
    g. removing said uniformly bright field; and
    h. repeating steps b, c and d for each of said detection elements to produce a corrected signal related to the image sensed by the corresponding detection element.

8. A method as in claim 7 wherein step h further comprises the step of centering said detection elements about the point in each element where step f is performed.

9. A method as in claim 7 further comprising the step of altering said signal related to the image sensed from each of said detection elements by an analog shading signal.

10. A method as in claim 7 further comprising the steps of:
    altering each of a plurality of intermediate values in response to said comparing step, each intermediate value corresponding to a detection element; and altering the corresponding correction value when said intermediate value becomes a predetermined magnitude.

11. Apparatus for compensating for sensitivity variations in an image sensor, the sensing surface of said image sensor being divided into an array of detection elements, said apparatus comprising:
   means for detecting the sensitivity variation in each of said detection elements;
   means for generating a digital correction value for each detection element related to said variation;
   means for converting said digital correction value for each detection element into an analog correction value; and
   means for altering video data received from each detection element by the corresponding analog correction value, said altering means including means for scaling said analog correction value so that the maximum digital correction value corresponds to the maximum variation in sensitivity of each of said detection elements.

12. Apparatus for compensating for sensitivity variations in an image sensing device, the sensing surface of said image sensing device being divided into a plurality of detection elements, said apparatus comprising:
   means for detecting the sensitivity variation in each of said detection elements;
   means for generating a correction value for each of said detection elements related to said variation;
   means for filtering high frequency components out from said correction values; and
   means responsive to said filtering means, for altering analog video data received from each detection element by the corresponding analog form correction value.

13. Apparatus as in claim 12 wherein said altering means comprises a multiplier for producing corrected video data related to the product of the video data received from each detection element and the corresponding correction value.

14. Apparatus as in claim 12 wherein:
   said detecting means comprises means for comparing said altered video data with a reference; and
   said generating means further comprises means for altering each correction value, in response to the output of said comparing means, so that said altered video data approaches said reference.

15. Apparatus for compensating for sensitivity variations in an image sensing device, the sensing surface of said image sensing device being divided into a plurality of detection elements, said apparatus comprising:
   means responsive to raw video data from each of said elements of said sensing surface for altering said raw video data for each element by a correction value corresponding to said element to produce corrected video data;
   means for generating a reference, said reference generating means including integrating means responsive to said raw video signal;
   means for comparing the amplitude of said corrected video data to said reference; and
   means, responsive to said comparing means, for altering said correction values so that for each detection element, said corrected video data approaches said reference when a field of uniform brightness is sensed by said image sensing device.

16. Apparatus as in claim 15 further comprising means for generating an analog signal related to shading and means for adding the signal generated by said analog signal generating means to said correction values.

17. Apparatus for compensating for sensitivity variations in an image sensing device, the sensing surface of said image sensing device being divided into a plurality of detection elements, said apparatus comprising:
   means for storing correction values for each of said detection elements;
   means, responsive to said storing means, for altering raw video data from each of said detection elements to produce corrected video data;
   means for generating a reference;
   means for comparing said reference with said corrected video data;
   means, responsive to said comparing means, for altering said correction values so that for each detection element, said corrected video data approaches said reference when a field of uniform brightness is sensed by said image sensing device; and
   scratch pad memory means, responsive to said correction value altering means for storing the last significant bits of said correction values, said storing means being responsive to said memory means.

18. A method for compensating for sensitivity variations in an image sensing device, the sensing surface of said image sensing device being divided into a plurality of detection elements, said method comprising the steps of;
   first storing a correction value for each of said detection elements;
   altering raw video data from each of said detection elements with said correction values to produce corrected video data;
   generating a reference;
   comparing said reference with said corrected video data;
   altering, in response to said comparing step, said correction values so that for each detection element, said corrected video data approaches said reference when a field of uniform brightness is sensed by said image sensing device; and
   second storing, in response, to said correction value altering step, the least significant bits of said correction values, said first storing being responsive to said second storing step.

19. A method of compensating for sensitivity variations in an image sensing device, said image sensing device including a plurality of detection elements, said method comprising the steps of:
   determining the sensitivity variation in each of said detection elements;
   generating a first correction value for each detection element related to said variation by altering each of a plurality of intermediate values in response to said determining step, each intermediate value corresponding to a detection element; and altering the corresponding first correction value when said intermediate value becomes a predetermined magnitude;
   determining the output of each of said detection elements when a black field is presented to said image sensing device;
   generating a second correction value for each detection element related to said output;
   altering video data received from each of said detection elements by the corresponding second correction value; and altering video data received from each of said detection elements by the corresponding first correction value.

20. A method of compensating for sensitivity variations in an image sensing device, said image sensing device including a plurality of detection elements, said method comprising the steps of:
   determining the sensitivity variation in each of said detection element;
   generating a first correction value for each detection element related to said variation;
   determining the output of each of said detection elements when a black field is presented to said image sensing device;
   generating a second correction value for each detection element related to said output;
   altering video data received from each of said detection elements by the corresponding second correction value;
   altering video data received from each of said detection elements by the corresponding first correction value; and
   altering video data received from each of said detection elements by an analog shading signal.

21. Apparatus for compensating for sensitivity variations in an image sensing device, the sensing surface of said image sensing device being divided into a plurality of detection elements, said apparatus comprising:
   subtracting means, responsive to raw video data from said sensing surface for producing intermediate video data;
   memory means for storing additive values for each of said detection elements related to the output of each of said detection elements when a black field is presented to said image sensing device;
   digital-to-analog converting means responsive to said memory means for converting said additive values to analog form;
   said subtracting means also being responsive to said analog form correction values to produce said intermediate video data related to the difference between said raw video data and said analog form additive values;
   means for detecting the sensitivity variation in each of said detection elements;
   means for generating a correction value for each detection element related to said variation;
   means, responsive to said subtracting and generating means for altering video data received from each detection element; and
   means for filtering high frequency components from the output of said generating means.

22. Apparatus for compensating for sensitivity variations in an image sensing device, for sensing surface of said image sensing device being divided into a plurality of detection elements, said apparatus comprising:
   subtracting means, responsive to raw video data from said sensing surface for producing intermediate video data;
   memory means for storing additive values for each of said detection elements related to the output of each of said detection elements when a black field is presented to said image sensing device;
   digital-to-analog converting means responsive to said memory means for converting said additive values to analog form;
   said subtracting means also being responsive to said analog form correction values to produce said intermediate video data related to the difference between said raw video data and said analog form additive values;
   means for detecting the sensitivity variation in each of said detection elements;
   means for generating a correction value for each detection element related to said variation;
   means, responsive to said subtracting and generating means for altering video data received from each detection element; and
   means for generating an analog signal related to shading and means for adding the signal generated by said analog signal generating means to said correction values.

23. An improved video signal compensation circuit of the type which compensates for variations in individual sensor sensitivities within an array of image sensing elements by synchronously altering, in real time, video output signals from said elements with analog correction signals corresponding to previously measured, digitized and stored correction factors for each sensor related to its particular sensitivity wherein the improvement comprises:
   a calibration mode reference signal generator connected to generate a reference level signal derived from the level of video output signals emanating from plural sensing elements for a given constant level of illumination;
   a comparator for individually comparing the level of each of the altered video output signals for said given constant level of illumination with said reference level to generate a control signal output related to the relative level values; and
   digital means for digitally determining and storing the correction factor for each of said sensor elements in response to said control signal output.

24. An improved video signal compensation circuit as in claim 23 wherein said digital means comprises:
   indexing means for accumulating a predetermined net number of successive control signal outputs indicating a need to increment or decrement the then existing stored correction factor for a given sensor element and, in response to such net accumulation, to increment or decrement the then existing stored correction factor for that element, as required to cause its said altered video output signal to approach said reference level.

25. An improved video signal compensation circuit as in claim 24 wherein said indexing means increments or decrements the stored correction factor by adding or subtracting a value corresponding to the place value of its least significant digit.

26. An improved video signal compensation circuit as in claim 23, 24 or 25 wherein said digital means initially sets all of said correction factors to a value substantially midway in the possible range of expected correction factor values.

27. An improved video signal compensation circuit as in claim 23, 24 or 25 wherein said digital means includes sequencing means for successively processing only data related to interleaved subsets of said sensor elements thereby allowing sufficient time for each complete cycle of its operation when presented with real time video output signals.

28. An improved video signal compensation circuit as in claim 23 wherein said digital means includes:
   initial calibration means for incrementing or decrementing the least significant digit of the then existing stored correction factor in response to said control signal output as required to cause said altered video output signal to approach said reference level, thus to facilitate rapid convergence during an initial phase; and recursive filter means which operates after said initial calibration means for accumulating a predetermined net number of successive control signal outputs indicating a need to increment or decrement the then existing stored correction factor for a given sensor element and, in response to such net accumulation, to increment or decrement the then existing stored correction factor for that element, as required to cause its said altered video output signal to approach said reference level.

29. An improved video signal compensation circuit as in claim 28 wherein said recursive filter means increments or decrements the stored correction factor by adding or subtracting a value corresponding to the place value of its least significant digit.

30. An improved video signal compensation circuit as in claim 28 or 29 wherein said digital means initially sets all of said correction factors to a value substantially midway in the possible range of expected correction factor values.

31. An improved video signal compensation circuit as in claim 23, 24, 25, 28 or 29 wherein said digital means comprise:
a main memory for storing said correction factors, and
a scratch pad memory for storing accumulated control signals for each of said correction factors for use in potentially effecting subsequent corresponding changes therein.

32. An improved video signal compensation circuit as in claim 31 wherein said digital means includes:
an index register connected to receive, during evaluation of a given correction factor, said accumulated control signals from said scratch pad memory and said control signals corresponding thereto and to increment or decrement the respectively corresponding contents of at least one of the main memory and scratch pad memory in response thereto.

33. An improved video signal compensation circuit of the type which compensates for variations in individual sensor sensitivities within an array of image sensing elements by synchronously altering, in real time, successive field scan video output signals from said elements with analog correction signals corresponding to previously measured, digitized and stored correction factors for each sensor related to its particular sensitivity wherein the improvement comprises:
calibration means which, during substantially uniform illumination of said array and during a given field scan cycle, compares the altered video output signal for a given element with a reference level to generate an index control signaling the need to increment or decrement the corresponding then existing stored correction factor so as to cause the altered video output signal to approach said reference level; and
indexing means responsive to said index control for incrementing or decrementing said corresponding stored correction factor by a predetermined value.

34. An improved video signal compensation circuit as in claim 33 wherein said indexing means includes:
scratch pad memory means for accumulating a predetermined net number of similar index control signals during plural field scanning intervals for a given element before changing said corresponding stored correction factor.

35. An improved video signal compensation circuit as in claim 33 or 34 wherein said calibration means includes:
a reference signal generator connected to generate said reference level based upon the video output of plural ones of said elements.

36. An improved video signal compensation circuit of the type which compensates for variations in individual sensor sensitivities within an array of image sensing elements by synchronously altering, in real time, video output signals from said elements with analog correction signals corresponding to previously measured, digitized and stored correction factors for each sensor related to its particular sensitivity wherein the improvement comprises:
a calibration mode reference signal generator connected to generate a reference level signal;
a comparator for individually comparing the level of each of the altered video output signals for said given constant level of illumination with said reference level to generate a control signal output related to the relative level values; and
digital means for digitally determining and storing the correction factor for each of said sensor elements in response to said control signal output including indexing means for accumulating a predetermined net number of successive control signal output indicating a need to increment or decrement the then existing stored correction factor for a given sensor element and, in response to such net accumulation, to increment or decrement the then existing stored correction factor for that element, as required to cause its said altered video output signal to approach said reference level.

37. An improved video signal compensation circuit as in claim 36 wherein said indexing means increments or decrements the stored correction factor by adding or subtracting a value corresponding to the place value of its least significant digit.

38. An improved video signal compensation circuit as in claim 36 or 37 wherein said digital means initially sets all of said correction factors to a value substantially midway in the possible range of expected correction factor values.

39. An improved video signal compensation circuit as in claim 36 or 37 wherein said digital means includes sequencing means for successively processing only data related to interleaved subsets of said sensor elements thereby allowing sufficient time for each complete cycle of its operation when presented with real time video output signals.

40. An improved video signal compensation circuit as in claim 36 wherein said digital means includes:
initial calibration means for incrementing or decrementing the least significant digit of the then existing stored correction factor in response to said control signal output as required to cause said altered video output signal to approach said reference level, thus to facilitate rapid convergence during an initial phase following which said indexing means is operative.

41. An improved video signal compensation circuit as in claim 36 or 37 wherein said digital means comprise:
a main memory for storing said correction factors, and a scratch pad memory for storing accumulated control signals for each of said correction factors for use in potentially effecting subsequent corresponding changes therein.

42. An improved video signal compensation circuit as in claim 41 wherein said indexing means includes:
an index register connected to receive, during evaluation of a given correction factor, said accumulated control signals from said scratch pad memory and said control signals corresponding thereto and to increment or decrement the respectively corresponding contents of at least one of the main memory and scratch pad memory in response thereto.

43. A method of compensating for sensitivity variations in an image sensing device, said image sensing device including a plurality of detection elements, said method comprising the steps of:
determining the sensitivity variation in each of said detection elements;
generating a first correction value for each detection element related to said variation;
determining the output of each of said detection elements when a black field is presented to said image sensing device;
generating a second correction value for each detection element related to said output;
altering video data received from each of said detection elements by the corresponding first correction value;
altering said video signal received from each of said detection elements by the corresponding second correction value;
said first correction value generating step further comprising the step of storing said first correction values in a memory; and
said first correction value altering step further comprising the step of scaling the analog form of said first correction value so that the maximum first correction value capable of being stored in said memory corresponds to the maximum deviation in sensitivity of said image sensing device.

* * * * *